(12) United States Patent
Yoshida et al.

(10) Patent No.: US 9,242,574 B2
(45) Date of Patent: Jan. 26, 2016

(54) FUEL-CELL ELECTRIC VEHICLE

(75) Inventors: Hiromichi Yoshida, Saitama (JP);
Kiyohide Hibino, Saitama (JP); Ryo Jinba, Saitama (JP); Kaoru Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 2154 days.

(21) Appl. No.: 11/725,930

(22) Filed: Mar. 20, 2007

(65) Prior Publication Data
US 2007/0231639 A1   Oct. 4, 2007

(30) Foreign Application Priority Data

Mar. 31, 2006   (JP) .................................. 2006-096898

(51) Int. Cl.
*H01M 8/04*   (2006.01)
*B60L 11/18*   (2006.01)

(52) U.S. Cl.
CPC ......... *B60L 11/1887* (2013.01); *B60L 11/1892* (2013.01); *H01M 8/0491* (2013.01); *H01M 8/0494* (2013.01); *H01M 8/04126* (2013.01); *H01M 8/04313* (2013.01); *H01M 8/04731* (2013.01); *H01M 8/04753* (2013.01); *H01M 8/04761* (2013.01); *H01M 8/04768* (2013.01); *H01M 8/04835* (2013.01); *B60L 2260/54* (2013.01); *B60L 2260/56* (2013.01); *H01M 8/04156* (2013.01); *H01M 8/04253* (2013.01); *H01M 2250/20* (2013.01); *Y02E 60/50* (2013.01); *Y02T 10/92* (2013.01); *Y02T 90/32* (2013.01); *Y02T 90/34* (2013.01)

(58) Field of Classification Search
CPC ..................... H01M 8/04156; H01M 8/04179; H01M 8/04231; H01M 8/04253
See application file for complete search history.

(56) References Cited

U.S. PATENT DOCUMENTS

| | | | |
|---|---|---|---|
| 6,861,167 B2 * | 3/2005 | Wells et al. | 429/432 |
| 2004/0219401 A1 * | 11/2004 | Hobmeyr et al. | 429/13 |
| 2005/0214605 A1 * | 9/2005 | Saitoh et al. | 429/22 |

FOREIGN PATENT DOCUMENTS

| | | | |
|---|---|---|---|
| JP | 2002-313395 | * 10/2002 | H01M 8/04 |
| JP | 2003-297399 | 10/2003 | |
| JP | 2005-317224 | 11/2005 | |

OTHER PUBLICATIONS

Machine translation of JP2002-313395 from IPDL. printed Feb. 2, 2005.*

(Continued)

*Primary Examiner* — Maria J Laios
(74) *Attorney, Agent, or Firm* — Nelson Mullins Riley & Scarborough LLP; Anthony A. Laurentano

(57) ABSTRACT

When a fuel-cell electric vehicle is running at idle, and a predetermined period of time has elapsed since the vehicle comes into the idle state, forthcoming stopping of an operation of the vehicle is predicted, and the operation mode of a fuel cell is shifted to a residual water reduction mode in which residual water remaining inside the fuel cell is reduced. In the residual water reduction mode, for example, the amount of humidification for air to be supplied to the fuel cell is reduced, so that the air with reduced humidity passes through the fuel cell, to thereby increase the amount of residual water removed by the air. Accordingly, the residual water inside the fuel cell can be reduced before the actual stopping of the operation of the vehicle.

11 Claims, 4 Drawing Sheets

(56) References Cited

OTHER PUBLICATIONS

Machine translation of JP 2005-317224 provided by ESpacenet printed Mar. 22, 2014.*

Japanese Office Action for Application No. 2006-096898, dated Dec. 6, 2011.

* cited by examiner

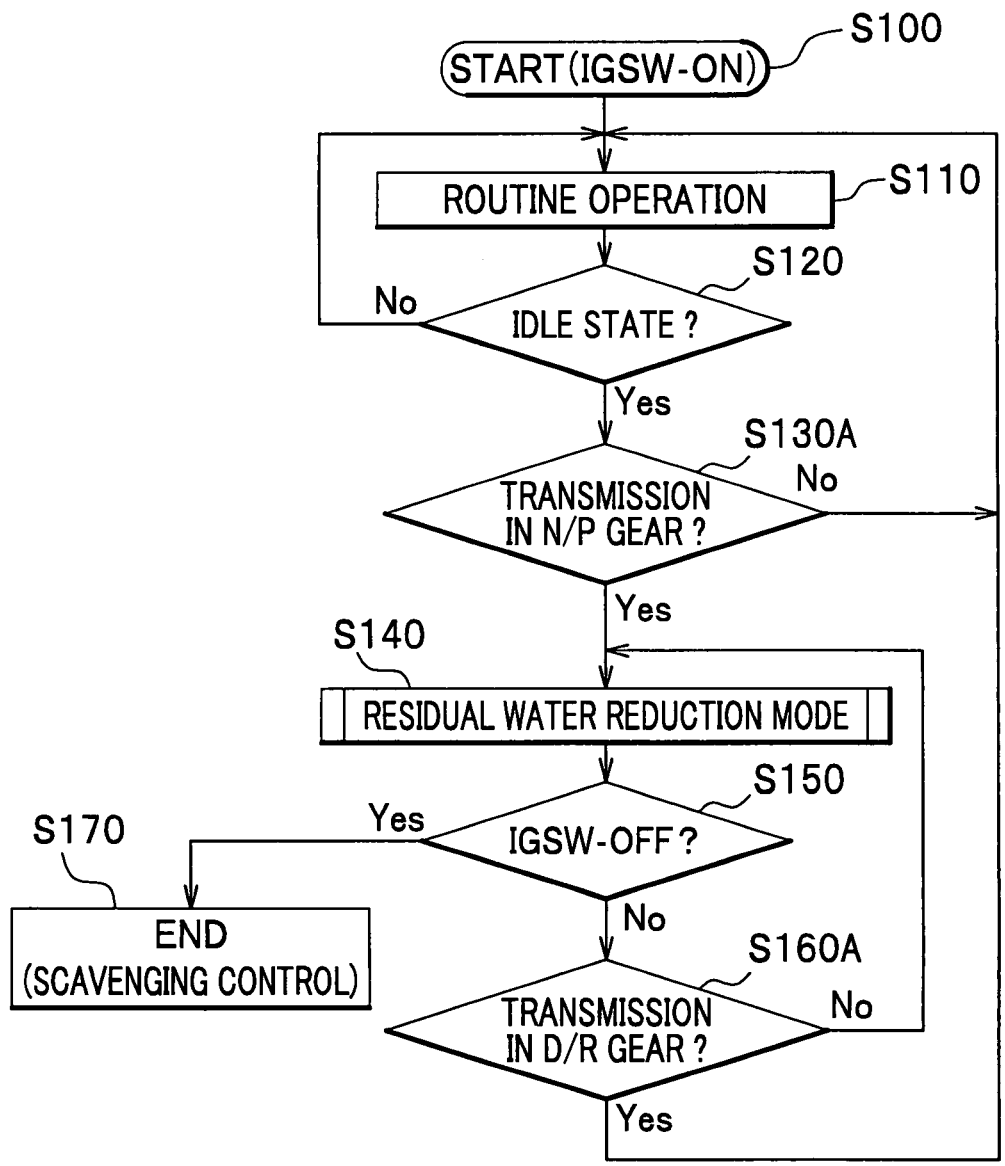

FUEL-CELL ELECTRIC VEHICLE

CROSS-REFERENCE TO RELATED APPLICATION(S)

This application claims the foreign priority benefit under Title 35, United States Code, §119 (a)-(d), of Japanese Patent Application No. 2006-096898, filed on Mar. 31, 2006 in the Japan Patent Office, the disclosure of which is herein incorporated by reference in its entirety.

BACKGROUND OF THE INVENTION

This invention relates to a fuel-cell electric vehicle in which stopping of the operation of the vehicle is predicted to reduce residual water before the stopping in actuality.

The fuel cell generates electricity by electrochemical reaction between hydrogen and oxygen, and produces water at the same time. When the fuel cell is used under low-temperature conditions, product water remaining inside the fuel cell (residual water) would become frozen, which would deteriorate a membrane electrode assembly or MEA and lower its startup characteristics, thus significantly impairing its marketability for these or other reasons. Accordingly, a variety of proposals for improving a fuel cell system have been made such that residual water is reduced by a process of introducing a gas into a fuel cell (also called "scavenging process") at a time when the fuel cell stops operating, in order to prevent the product water from becoming frozen in the fuel cell. See, for example, JP 2003-297399 A (FIG. 1).

However, typical scavenging processes used in a fuel cell system require a large amount of energy, for which electric power should be fed from a power source other than the fuel cell, such as a battery, thus increasing the size of the power source. In addition, such scavenging processes would produce noises. Consequently, the scavenging processes could disadvantageously impair the marketability.

The present invention has been made in an attempt to overcome the above disadvantages. In any case, it would be desirable to provide a fuel-cell electric vehicle in which the energy consumption and/or the noises in the scavenging process can be reduced.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a fuel-cell electric vehicle comprising a fuel cell for generating electricity with a reactant gas supplied thereto. The fuel-cell electric vehicle comprises a vehicle idling detection unit, an operation stopping prediction unit and a residual water amount control unit. The vehicle idling detection unit is configured to determine whether the vehicle is running at idle. The operation stopping prediction unit is configured to predict forthcoming stopping of operation of the vehicle running at idle. The residual water amount control unit is configured to reduce residual water inside the fuel cell in response to a prediction of the forthcoming stopping of the operation of the vehicle made by the operation stopping prediction unit.

With this configuration, the prediction of stopping of the operation of the vehicle makes it possible to reduce residual water inside the fuel cell before the operation of the vehicle is actually stopped, which shortens a scavenging time, thus reducing energy consumption and noises.

In an exemplary embodiment, the fuel-cell electric vehicle as above may further comprise a humidifier for humidifying the reactant gas to be supplied to the fuel cell. The residual water amount control unit may comprise means for causing at least part of the reactant gas to be detoured around the humidifier in response to the prediction of the forthcoming stopping of the operation of the vehicle made by the operation stopping prediction unit, to lower a humidity of the reactant gas.

This embodiment is designed to reduce the amount of humidification to which the reactant gas is subjected in the humidifier, so that the reactant gas with a lowered humidity is supplied to the fuel cell. Therefore, the amount of residual water removed from inside the fuel cell can be increased.

In another exemplary embodiment, the fuel-cell electric vehicle as above may further comprise a cooling system with a coolant circulated to cool the fuel cell. The residual water amount control unit may comprise means for regulating a cooling performance of the cooling system. The means for regulating a cooling performance of the cooling system in this embodiment is configured to reduce the cooling performance in response to the prediction of the forthcoming stopping of the operation of the vehicle made by the operation stopping prediction unit.

This embodiment is designed to reduce the amount of heat to be transferred from the fuel cell, so as to raise a temperature of the fuel cell. Accordingly, the temperature of the reactant gas rises, and the amount of saturated vapor in the reactant gas increases. Therefore, the amount of residual water removed from inside the fuel cell can be increased.

In yet another exemplary embodiment, the fuel-cell electric vehicle as above may further comprise means for regulating a flow rate of the reactant gas to be supplied to the fuel cell. The means for regulating the flow rate of the reactant gas in this embodiment is configured to increase the flow rate in response to the prediction of the forthcoming stopping of the operation of the vehicle made by the operation stopping prediction unit.

Increase in the flow rate of the reactant gas according to this embodiment allows the residual water inside the fuel cell to be blown off with increased ease, thus accelerating the drainage of the residual water.

In yet another exemplary embodiment, the fuel-cell electric vehicle as above may further comprise means for regulating a pressure of the reactant gas supplied to the fuel cell. The means for regulating a pressure of the reactant gas in this embodiment is configured to reduce the pressure of the reactant gas in response to the prediction of the forthcoming stopping of the operation of the vehicle made by the operation stopping prediction unit.

Reduction in the pressure of the reactant gas according to the present embodiment increases a volume flow rate of the reactant gas as well as a flow velocity of the reactant gas. Therefore, the amount of residual water removed from inside the fuel cell can be increased. Moreover, the reduction in the pressure of the reactant gas would decrease the efficiency in electric power generation, and thus increase an internal resistance of the fuel cell, whereby the temperature of the fuel cell would rise. Accordingly, the temperature of the reactant gas rises, and the amount of saturated vapor in the reactant gas increases. Therefore, the amount of residual water carried by the reactant gas and removed from inside the fuel cell can be increased.

In another aspect of the present invention, there is provided a method for reducing residual water in a fuel cell before scavenging the residual water. The fuel cell consistent with the present invention is installed in a fuel-cell electric vehicle to generate electricity with a reactant gas supplied thereto. The method comprises: determining whether the vehicle is running at idle; predicting forthcoming stopping of operation of the vehicle running at idle; and reducing residual water inside the fuel cell when the forthcoming stopping of the operation of the vehicle is predicted.

BRIEF DESCRIPTION OF THE DRAWINGS

The above aspects, other advantages and further features of the present invention will become more apparent by describing in detail illustrative, non-limiting embodiments thereof with reference to the accompanying drawings, in which:

FIG. 5 is a flowchart of an alternative process to be performed when a vehicle is running at idle.

DETAILED DESCRIPTION OF THE EXEMPLARY EMBODIMENTS

Figure 1:
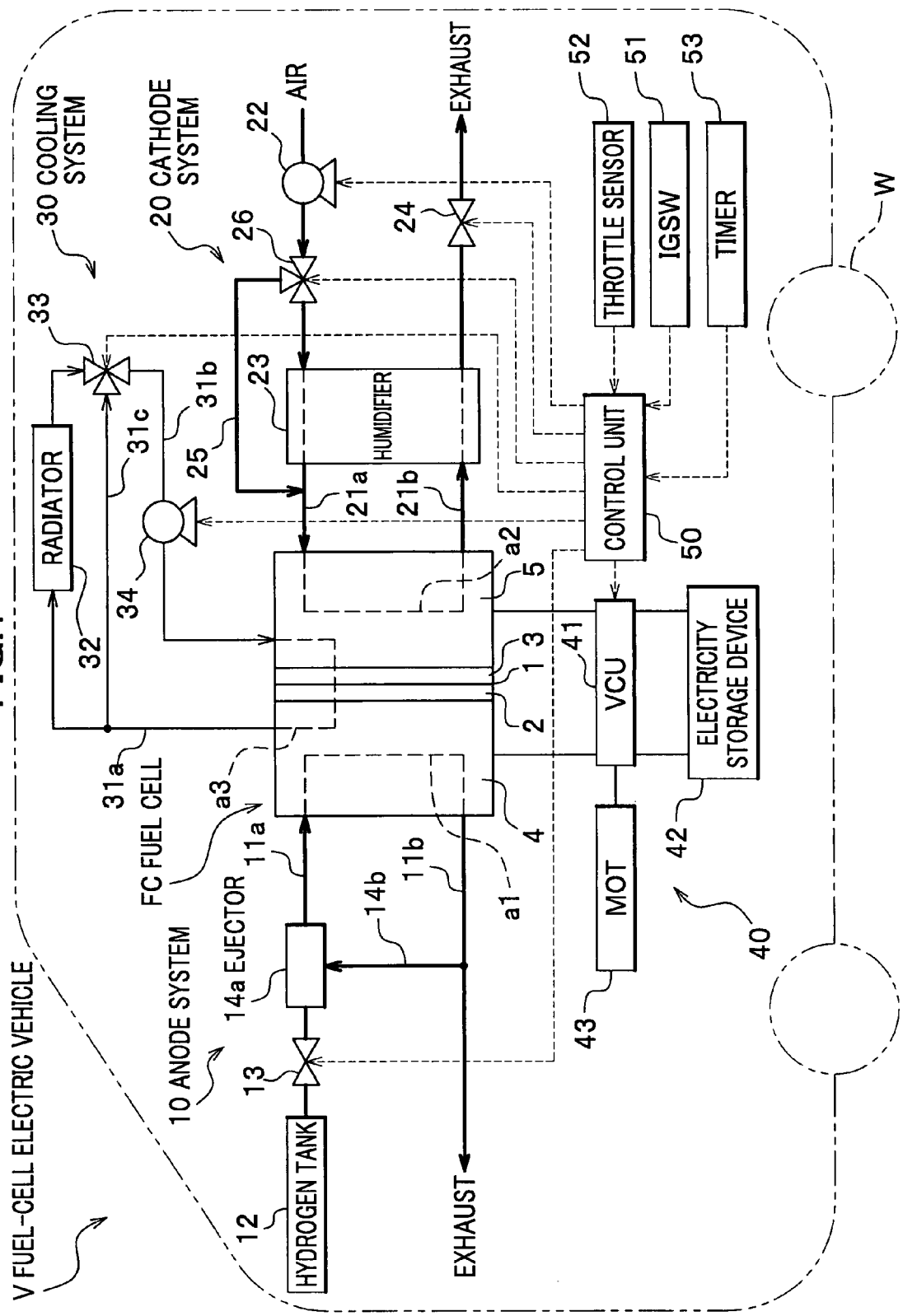
FIG. 1 is a general schematic diagram of a fuel-cell electric vehicle according to an exemplary embodiment of the present invention.

As shown in FIG. 1, a fuel-cell electric vehicle V according to one exemplary embodiment of the present invention includes a fuel cell FC, an anode system 10, a cathode system 20, a cooling system 30, a high-voltage system 40, a control unit 50, and various other components.

The fuel cell FC is provided as a fuel cell stack consisting of unit cells. Each unit cell is comprised of a solid polymer electrolyte membrane (hereinafter referred to simply as "electrolyte membrane") 1, an anode 2, a cathode 3 and two separators 4, 5. The electrolyte membrane 1 has proton conductivity. The anode 2 is provided at one side of the electrolyte membrane 1 and the cathode 3 is provided at the other side of the electrolyte membrane 1; the electrolyte membrane 1 thus sandwiched between the anode 2 and the cathode 3 forms a membrane electrode assembly (MEA). On both sides of the MEA are provided the separators 4, 5, which not only serve to separate unit cells but also serve as manifolds to distribute reactant gases such as fuel gases (e.g., hydrogen) and oxidant gases (e.g., air), as well as and a cooling medium, between and within the unit cells. To be more specific, Formed in the fuel cell FC are: a hydrogen channel a1 for conducting hydrogen as a reactant gas, an air channel a2 for conducting air as a reactant gas, and a coolant channel a3 for conducting a cooling medium (coolant) circulated to cool the fuel cell FC.

The anode system 10 is constructed to supply and discharge hydrogen to and from the anode 2 of the fuel cell FC, and includes an anode gas supply line 11a, an anode exhaust gas line 11b, a hydrogen tank 12, a shutoff valve 13, an ejector 14a, an anode gas circulation line 14b, and other components.

The anode gas supply line 11a is a pipe providing a passage through which hydrogen is supplied to the anode 2 of the fuel cell FC. The anode gas supply line 11a has two ends of which one is connected to an inlet of the hydrogen channel a1 of the fuel cell FC, while the other is connected to the hydrogen tank 12 with the shutoff valve 13 and the ejector 14a interposed between the other end of the anode gas supply line 11a and the hydrogen tank 12.

The anode exhaust gas line 11b is a pipe providing a passage through which hydrogen discharged from the anode 2 of the fuel cell FC flows. The anode exhaust gas line 11b has two ends of which one is connected to an outlet of the hydrogen channel a1 of the fuel cell FC, while the other is connected to an exhaust port (not shown) which opens to the outside of the vehicle V so that hydrogen discharged from the anode 2 is released out into the atmosphere.

The hydrogen tank 12 is a container filled with high-purity hydrogen. Although not illustrated, the hydrogen tank 12 may for example be laid on its side in a rearward position in the fuel-cell electric vehicle V.

The shutoff valve 13 is, for example, a solenoid-controlled valve configured to open and close in accordance with a control signal transmitted from the control unit 50. In one embodiment, the shutoff valve 13 is disposed in the vicinity of the hydrogen tank 12. Alternatively, the shutoff valve 13 may be an in-tank solenoid-controlled valve that is disposed within the hydrogen tank 12.

The ejector 14a is connected by the anode gas circulation line 14b with the anode exhaust gas line 11b, and configured to feed unreacted hydrogen discharged from the anode 2 of the fuel cell FC back to the anode 2 of the fuel cell FC. With this construction, a waste of hydrogen (discharge of usable hydrogen) can be avoided, and thus the utilization efficiency of the hydrogen can be increased.

The cathode system 20 is constructed to supply and discharge air to and from the cathode 3 of the fuel cell FC, and includes a cathode gas supply line 21a, a cathode exhaust gas line 21b, an air compressor 22, a humidifier 23, a back-pressure valve 24, a humidifier bypass line 25, a cross valve 26 and other components.

The cathode gas supply line 21a is a pipe providing a passage through which air is supplied to the cathode 3 of the fuel cell FC. The cathode gas supply line 21a has two ends of which one is connected to an inlet of the air channel a2 of the fuel cell FC, while the other is connected to the air compressor 22 with the humidifier 23 and the cross valve 26 interposed between the other end of the cathode gas supply line 21a and the air compressor 22.

The cathode exhaust gas line 21b is a pipe providing a passage through which an exhaust gas (consisting principally of air and product water) discharged from the cathode 3 of the fuel cell FC flows. The cathode exhaust gas line 21b has two ends of which one is connected to an outlet of the air channel a2 of the fuel cell FC, while the other is connected to an exhaust port (not shown) which opens to the outside of the vehicle, with the humidifier 23 and the back-pressure valve 24 interposed between the other end of the cathode exhaust gas line 21b and the exhaust port, so that air in the cathode system 20 is flowed under a regulated pressure through the cathode-side separator 5 and the humidifier 23 and released out into the atmosphere.

The air compressor 22 is comprised of a supercharger or the like driven by a motor, and is configured to take in outside air (from outside the vehicle V), and compress and supply the same to the fuel cell FC.

The humidifier 23 is configured to humidify air supplied from the air compressor 22, and includes water-permeable hollow fiber membranes. Humidification of air to be supplied to the fuel cell FC improves the proton conductivity of the electrolyte membrane 1, thus increasing the electrical generating capacity.

The back-pressure valve 24 is, for example, a butterfly valve configured to change a throttle opening thereof in accordance with a control signal transmitted from the control unit 50, so that air supplied to the cathode 3 of the fuel cell FC is regulated.

The humidifier bypass line 25 is a pipe providing a bypass through which air supplied from the air compressor 22 can be detoured around the humidifier 23 and passed directly to the fuel cell FC.

The cross valve 26 is provided at a joint located at a midpoint of the humidifier bypass line 25 upstream relative to the humidifier 23 and regulated in such a way that the at least part of air supplied from the air compressor 22 can be detoured through the humidifier bypass line 25.

The cooling system 30 is constructed to circulate a cooling medium or coolant (e.g., an antifreezing solution with ethylene glycol, etc. added as a principal antifreeze component) so as to cool the fuel cell FC, and includes coolant lines 31a, 31b, 31c, a radiator 32, a switching valve 33, a circulating pump 34, and other components.

The coolant line 31a has two ends of which one is connected to an outlet of the coolant channel a3 of the fuel cell FC, while the other is connected to an inlet of the radiator 32. The coolant line 31b has two ends of which one is connected to an outlet of the radiator 32, while the other is connected to an inlet of the coolant channel a3 of the fuel cell FC with the switching valve 33 and the circulating pump 34 interposed between the other end of the coolant line 31b and the inlet of the coolant channel a3 of the fuel cell FC. The coolant line 31c is a pipe providing a bypass through which the circulating cooling medium can be detoured around the radiator 32. The coolant line 31c has two ends of which one is connected to the coolant line 31a and the other is connected to the switching valve 33 disposed at a midpoint of the coolant line 31b. The coolant lines 31a and 31b together with the coolant channel a3 make up a coolant circulation line, and the coolant line 31c serves as a radiator bypass line, as defined in the appended claims.

The radiator 32 is constructed to emit heat by radiation from a cooling medium which has been heated in the fuel cell FC. The radiator 32 may for example be installed in a frontward position in the fuel-cell electric vehicle V.

The switching valve 33 is configured to switch between a cooling position in which the cooling medium discharged from the fuel cell FC is allowed to flow through the radiator 32, and a bypass position in which the circulating cooling medium is detoured around the radiator 32.

The circulating pump 34 is driven by a motor and configured to circulate the cooling medium through the coolant channel a3 of the fuel cell FC.

The high-voltage system 40 includes a voltage control unit or VCU 41, an electricity storage device 42, an electric motor (MOT) 43, and other components.

The VCU 41 is configured to control an output current (electric power) resulting from power generation of the fuel cell FC in accordance with a power generation instruction transmitted from the control unit 50 that will be described later.

The electricity storage device 42 is an auxiliary power source for supplementing the electrical generating capacity of the fuel cell FC. The electricity storage device 42 may include, for example, a lead-acid battery, a nickel metal hydride battery, a lithium-ion battery, or other type of batteries, a capacitor, or the like.

The electric motor 43 is a traction motor comprised, for example, of a permanent magnet three-phase alternating-current synchronous motor, to drive and rotate driving wheels W installed in the fuel-cell electric vehicle V.

The control unit 50 is comprised of a central processing unit or CPU, a memory, an input/output interface, and other components, and includes an operation stopping prediction unit as embodied according to the present invention. The control unit 50 is connected with the shutoff valve 13, the air compressor 22, the back-pressure valve 24, the cross valve 26, the switching valve 33, the circulating pump 34, a starter switch (IGSW) 51, a throttle sensor 52 for determining a throttle opening by measuring a position of an accelerator pedal (not shown), and a timer 53. The control unit 50 is configured to exercise control over the opening and closing of the shutoff valve 13, the rotation speed of a motor of the air compressor 22, the throttle opening of the back-pressure valve 24, the position of the cross valve 26, and the rotation speed of a motor of the circulating pump 34, respectively. For the purpose of control, the control unit 50 is configured to receive an ON or OFF signal of the starter switch 51, a throttle opening signal from the throttle sensor 52, and a time (elapsed time from a time when it is determined that the vehicle has come into an idle state) measured by the timer 53, respectively.

Next, an operation of the fuel-cell electric vehicle according to the present embodiment will be described with reference to FIGS. 2-4 (reference is made to FIG. 1 where appropriate). It is understood that when the starter switch 51 of the fuel-cell electric vehicle V is in the OFF position (i.e., the vehicle V is not operating), the shutoff valve 13 is closed, the air compressor 22 is not operating, the back-pressure valve 24 is closed, the cross valve 26 is in a non-bypass position where the humidifier 23 is not bypassed, the switching valve 33 is in a bypass position where the radiator 32 is bypassed, and the circulating pump 34 is not operating.

When the control unit 50 determines in step S100 that the starter switch 51 of the fuel-cell electric vehicle V is set to the ON position (upon receipt of an ON signal from the starter switch 51), the control unit 50 issues instructions such that the shutoff valve 13 is opened to supply hydrogen to the anode 2 of the fuel cell FC, and the air compressor 22 is driven to supply air to the cathode 3 of the fuel cell FC. Accordingly, hydrogen ions (protons) at the anode 2 of the fuel cell FC migrate through the electrolyte membrane 1 to the cathode 3, while electrons move via an external load such as the electric motor 43 to the cathode 3. At the cathode 3, the hydrogen ions and the electrons react with oxygen in the air to produce water. Thus-produced water (product water) is forced out of the cathode 3 of the fuel cell FC, passing through the cathode exhaust gas line 21b, and fed to the humidifier 23 and used therein to humidify air to be supplied to the cathode 3 of the fuel cell FC.

During a routine operation in step S110, the control unit 50 instructs the VCU 41 to regulate an electric power (output current) to be obtained from power generation of the fuel cell FC, in accordance with the throttle opening detected by the throttle sensor 52. If the fuel cell FC needs to be cooled, the control unit 50 drives the circulating pump 34 and switches the switching valve 33 to a cooling position in which the cooling medium is allowed to pass through the radiator 32, so that the cooling medium is circulated between the fuel cell FC and the radiator 32 to thereby cool the fuel cell FC. If the fuel cell FC is cooled to a predetermined temperature, the switching valve 33 is switched to a bypass position in which the cooling medium is allowed to pass through the coolant line (radiator bypass line) 31c, thus avoiding the radiator 32.

Proceeding to step S120, the control unit 50 determines whether or not the fuel-cell electric vehicle (vehicle) V is running at idle. Determination as to whether the vehicle V is running at idle may be made by determining whether the throttle opening measured by the throttle sensor 52 is zero (i.e., the throttle opening signal output from the throttle sensor 52 indicates that the throttle is closed or that the accelerator pedal is not depressed). If the control unit 50 determines in step S120 that the vehicle V is not running at idle (No), then the process goes back to step S110 and retains the vehicle V in the routine operation. If the control unit 50 determines in step S120 that the vehicle V is running at idle (Yes), then the process goes to step S130.

In step S130, the control unit 50 obtains from the timer 53 an elapsed time from a time when the vehicle V has come into an idle state. If the control unit 50 determines in step S130 that a predetermined time has not yet passed since the vehicle V has come into the idle state (No), then the process goes back to step S110.

If the control unit 50 determines in step S130 that the predetermined time has passed since the vehicle V came into the idle state, i.e., the idle state stays for the predetermined time (Yes), then the control unit 50 predicts that the fuel-cell electric vehicle (vehicle) V will stop its operation afterwards (a forthcoming stopping of an operation of the vehicle V), and the control unit 50 shifts the operation mode of the fuel cell FC of the vehicle V into a residual water reduction mode in which residual water remaining inside the fuel cell FC is reduced (step S140). The residual water to be reduced herein is product water resulting from power generation of the fuel cell FC. It is understood that this step S130 is executed by a control module of the control unit 50 corresponding to an operation stopping prediction unit as defined in the appended claims.

Figure 2:
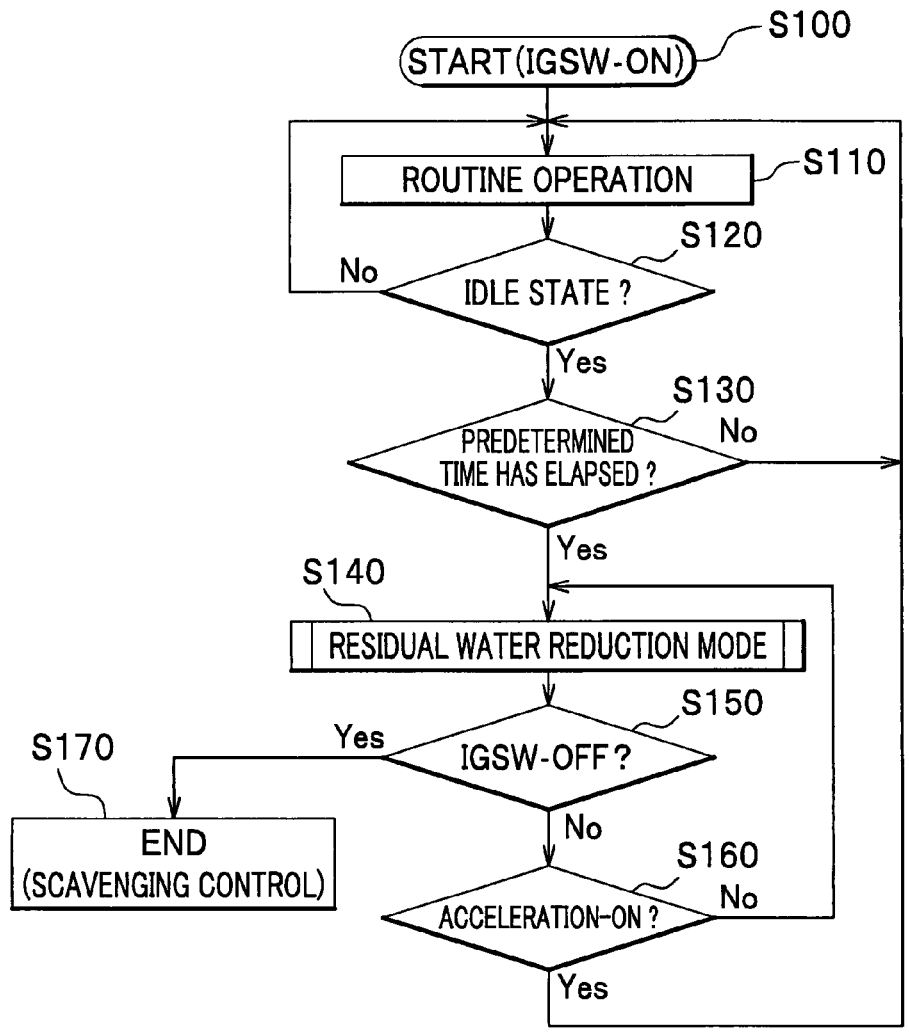
FIG. 2 is a flowchart of a process to be performed when a vehicle is running at idle.
Figure 3:
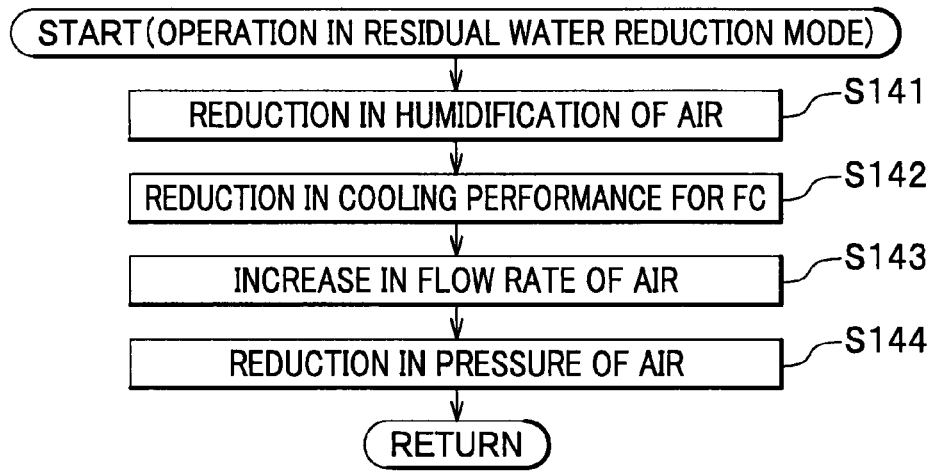
FIG. 3 is a flowchart of a subordinate process performed in a residual water reducing mode of FIG. 2.

Referring now to FIG. 3, in which an exemplary control process in the residual water reduction mode shown in step S140 of FIG. 2 is illustrated in more detail, the control unit 50 executes in step S141 a process step of lowering a humidity of air (reactant gas) to be supplied to the fuel cell FC. To be more specific, the humidity of air is lowered by switching the cross valve 26 so that part of the air introduced from the air compressor 22 is allowed to pass through the humidifier bypass line 25. The air subjected to humidification of which an amount is reduced according to the amount of the air caused to flow through the humidifier bypass line 25 is supplied to the fuel cell FC, and the air with a humidity thus reduced is more likely to take in the product water remaining inside the fuel cell FC while passing through the fuel cell FC. The air with the product water taken in is then discharged through the cathode exhaust gas line 21b to the outside of the vehicle V. Although part of the air is caused to pass through the humidifier bypass line 25 (while the rest is allowed to go through the humidifier 23) in this embodiment, the cross valve 26 may be regulated in such a manner that all of the air is detoured around the humidifier 23, as the case may be. It is understood that this step S141 is executed by a control module of the control unit 50 corresponding to a residual water amount control unit, which comprises means for causing at least part of the reactant gas to be detoured around the humidifier, as defined in the appended claims. In other words, the residual water amount control unit may, as in this embodiment (particularly in step S141), be comprised mainly of the humidifier bypass line 25, the cross valve 26, and the aforementioned control module of the control unit 50.

Figure 4A:
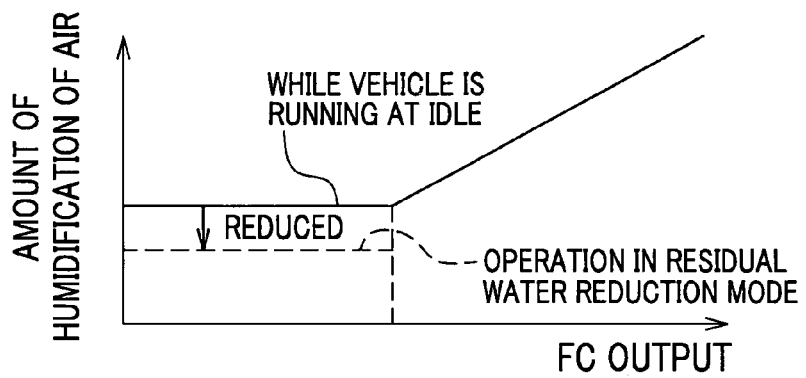
FIG. 4A is a graph showing a relationship between an amount of air humidification and a power output.

In the present embodiment, the amount of humidification for the air to be supplied to the fuel cell FC is reduced as shown in FIG. 4A, and thus the amount of residual water removed from inside the fuel cell FC can be increased.

In step S142, the control unit 50 executes a process step of reducing a cooling performance of the cooling system 30 with a cooling medium (coolant) circulated to cool the fuel cell FC. In this process step, the cooling performance of the cooling system 30 may, in one exemplary embodiment, be regulated by switching the switching valve 33 so that the cooling medium is caused to pass through the coolant line 31c (radiator bypass line) configured to divert the cooling medium from the coolant circulation line (31a, 31b and a3) to avoid the radiator 32. In another exemplary embodiment, the cooling performance of the cooling system 30 may be regulated by regulating the circulating pump 34 so that the rotation speed of the circulating pump 34 is reduced or the rotation thereof is stopped. In cases where the cooling medium is not detoured around the radiator 32, the switching valve 33 as illustrated may be substituted with a thermostatic valve as used in the prevailing cooling systems for vehicles. It is understood that this step S142 is executed by a control module of the control unit 50 corresponding to a residual water amount control unit, which comprises means for regulating the cooling performance of the cooling system, as defined in the appended claims. In other words, the residual water amount control unit may, as in this embodiment (particularly in step S142), be comprised mainly of the circulating pump 34, or a combination of the coolant line 31c and the switching valve 33, and the aforementioned control module of the control unit 50.

Figure 4B:
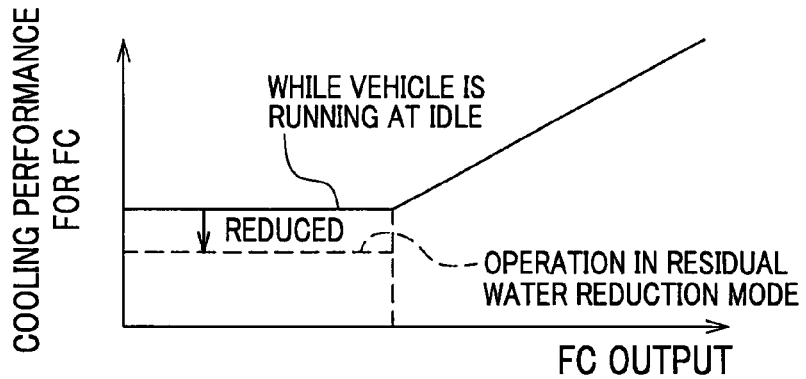
FIG. 4B is a graph showing a relationship between an amount of a cooling medium (coolant) and a power output.

In the present embodiment, the flow rate of cooling medium circulating through the fuel cell FC is reduced or the cooling medium is detoured around the radiator 32, with the result that the cooling performance of the cooling system 30 for the fuel cell FC of the vehicle V running at idle is reduced when the fuel cell FC is operating in the residual water reduction mode as shown in FIG. 4B. Accordingly, the temperature of the fuel cell FC goes up, and the temperature of air (reaction gas) inside the fuel cell FC goes up as well. As a result, the amount of saturated vapor in the air increases, and thus the amount of residual water removed from inside the fuel cell FC can be increased.

In step S143, the control unit 50 executes a process step of increasing a flow rate of the air to be supplied to the fuel cell FC. In this process step, the flow rate is regulated for example by increasing a rotation speed (the number of rotations) of the air compressor 22. It is understood that this step S143 is executed by a control module of the control unit 50 corresponding to a residual water amount control unit, which comprises means for regulating a flow rate of the reactant gas to be supplied to the fuel cell or means for regulating the reactant gas compressor (corresponding to the air compressor 22), as defined in the appended claims. In other words, the residual water amount control unit may, as in this embodiment (particularly in step S143), be comprised mainly of the air compressor 22 (reactant gas compressor) and the aforementioned control module of the control unit 50.

Figure 4C:
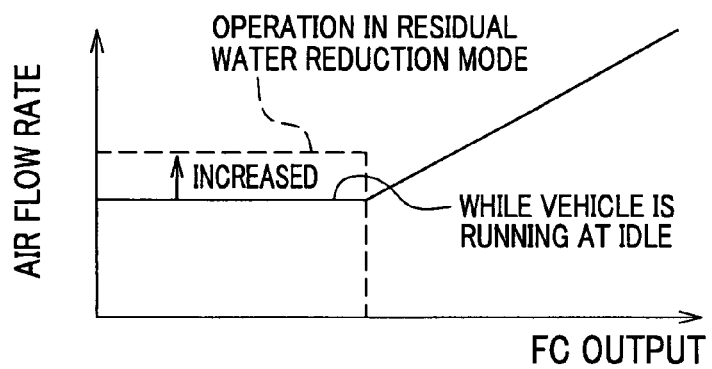
FIG. 4C is a graph showing a relationship between a flow rate of air and a power output.

In the present embodiment, the flow rate of reactant gas (air) is increased when the fuel cell FC of the vehicle V running at idle is operating in the residual water reduction mode as shown in FIG. 4C. This allows the residual water inside the fuel cell FC to be blown off with increased ease, thus accelerating the drainage of the residual water.

In step S144, the control unit 50 executes a process step of reducing a pressure of the air supplied to the fuel cell FC. In this process step, the pressure of the air is regulated by using a back-pressure valve 24 which is configured to increase a throttle opening thereof to reduce the pressure of the air supplied to the fuel cell FC. It is understood that this step S144 is executed by a control module of the control unit 50 corresponding to a residual water amount control unit, which comprises means for regulating a pressure of the reactant gas supplied to the fuel cell, as defined in the appended claims. In other words, the residual water amount control unit may, as in this embodiment (particularly in step S144), be comprised mainly of the back-pressure valve 24 and the aforementioned control module of the control unit 50.

Figure 4D:
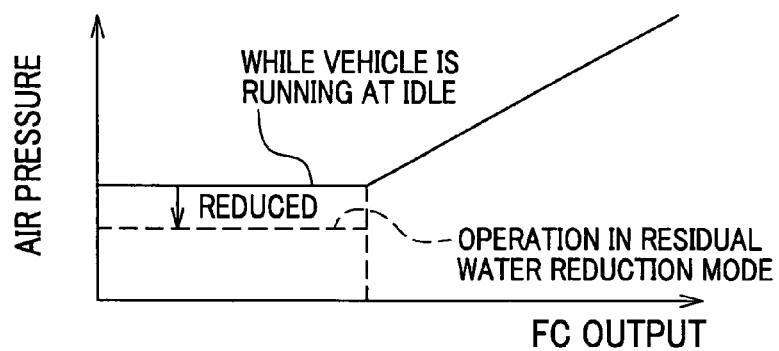
FIG. 4D is a graph showing a relationship between a pressure of air and a power output.

In the present embodiment, the pressure of reactant gas (air) supplied to the fuel cell FC is reduced when the fuel cell FC of the vehicle V running at idle is operating in the residual water reduction mode as shown in FIG. 4D. Accordingly, the flow quantity per unit volume of the air can be increased and the flow velocity of the air can be increased as well; therefore, the amount of residual water removed from inside the fuel cell FC can be increased. Moreover, the reduction in the pressure of the air would decrease the efficiency in electric power generation of the fuel cell FC, and thus increase an internal resistance of the fuel cell FC; for this or other reasons, the temperature of the fuel cell FC would go up. Thus, the amount of saturated vapor in the air increases, and the amount of residual water carried by the air and removed from inside the fuel cell FC can be increased.

Returning to FIG. 2, the control unit 50 determines in step S150 whether or not the starter switch (IGSW) 51 is turned OFF. If the control unit 50 determines in step S150 that the starter switch 51 has not been turned OFF (No), then the control unit 50 proceeds to step S160 and determines whether or not the acceleration has been turned ON (i.e., the accelerator pedal has been depressed, and the throttle is opened) on the basis of the throttle opening signal received from the throttle sensor 52.

If the control unit 50 determines in step S160 that the acceleration has not been turned ON (No), then the process goes back to step S140 in which the residual water reduction mode is continued. On the other hand, if the control unit 50 determines in step S160 that the acceleration has been turned ON (Yes), then the residual water reduction mode is stopped, and the fuel cell FC of the vehicle V is returned to the routine operation in step S110.

If the control unit 50 determines in step S150 that the starter switch 51 has been turned OFF (Yes), then the process of the control unit 50 comes to an end in step S170, and a scavenging control process is performed. The scavenging control process refers to a process carried out when the vehicle V is operating under low-temperature conditions such that residual water inside the fuel cell FC would be frozen, which includes driving the air compressor 22 by utilizing electric power supplied from the electricity storage device 42 after the power generation by the fuel cell FC stops, and feeding air into the fuel cell FC, so as to discharge the residual water to the outside of the vehicle V.

In the present embodiment, as described above, the fuel cell FC of the fuel-cell electric vehicle V (vehicle) shifts its operation mode to the residual water reduction mode in which residual water inside the fuel cell FC is reduced at a time when the prediction takes place that the fuel-cell electric vehicle V will stop its operation. Therefore, the scavenging time for the scavenging control process performed after the starter switch 51 is turned off and the operation of the vehicle V is stopped in actuality can be shortened. Accordingly, the energy consumption for the scavenging control process can be reduced, and thus the electricity storage device 42 can be miniaturized. Further, the scavenging time can be shortened, and thus the noises can be reduced.

Although the operation in the residual water reduction mode as illustrated according to the present embodiment includes all of four exemplary process steps consisting of: the reduction in the amount of humidification of air (step S141); the reduction in the cooling performance for the fuel cell FC (step S142); the increase in the flow rate of air (step S143); and the reduction in the pressure of air (step S144), the present invention may not require all of these process steps, and the present invention may be implemented with at least one process step selected among them, and these process steps may be executed singly or in combination without any limitation placed on the order of execution.

FIG. 5 is a flowchart of an alternative process to be performed when the vehicle V is running at idle. Since the process steps of the flow chart shown in FIG. 5 are the same as those in FIG. 2 with the exception that steps S130 and S160 in FIG. 2 are substituted with and illustrated as steps S130A and S160A, respectively, in FIG. 5, the same reference numerals are affixed to the common steps, and a duplicate description will be omitted herein.

If the control unit 50 determines in step S120 that the vehicle V is running at idle (in an idle state; Yes), then the control unit 50 proceeds to step S130A and determines whether or not the transmission is set in one of the N (normal) and P (parking) gears. If the control unit 50 determines in step S130A that the transmission is not in the N or P gear (No), then the process goes back to step S110. If the control unit 50 determines in step S130A that the transmission is in the N or P gear (Yes), then the control unit 50 shifts the operation mode of the fuel cell FC to the residual water reduction mode. The operation in the residual water reduction mode is carried out in a manner similar to that illustrated in FIG. 3.

Furthermore, during the operation in the residual water reduction mode (in step S140), if the starter switch 51 is ON (No in step S150) and the transmission is in the D (drive) or R (reverse) gear (Yes in step S160A), then the control unit 50 shifts the operation mode back to the routine operation, while if the transmission is not in the D or R gear (No in step S160A), then the control unit 50 continues the residual water reduction mode.

It is contemplated that numerous modifications may be made to the exemplary embodiments of the invention without departing from the spirit and scope of the embodiments of the present invention as defined in the following claims.

For example, the operation stopping prediction unit consistent with the present invention is not limited to the above embodiments the operations of which are described as steps S130 and S130A. Alternatively or optionally, means for detecting a position of the vehicle, such as a global positioning system (GPS), may be provided so that the forthcoming stopping of the operation of the vehicle can be predicted by using the detected position of the vehicle, i.e., if the position of the vehicle is within an area where the vehicle frequently stops, the likelihood of forthcoming stopping of the operation of the vehicle may be assumed. In this embodiment, the area where the vehicle frequently stops may be stored in advance and/or may be learnt by the past history of the driving route and operation of the vehicle. The area where the vehicle frequently stops may for example include a garage at home, a parking lot of a store, etc.

Although the above embodiments are configured to control the humidity, flow rate and/or pressure of air supplied to the cathode 3 of the fuel cell FC, the present invention is not limited thereto; it is to be understood another embodiment is practically conceivable that is configured to control the humidity, flow rate and/or pressure of hydrogen supplied to the anode 2 of the fuel cell FC.

In the above embodiments, the scavenging control process (step S170) causes the residual water to be discharged so as to prevent freezing of the residual water; thus improving the low-temperature startup characteristics of the fuel cell FC and enhancing the durability of the MEA.

According to the present invention, the energy consumption and/or the noises in the scavenging process can be reduced.

What is claimed is:

1. A method for reducing residual water in a fuel cell before scavenging the residual water, wherein the fuel cell is installed in a fuel-cell electric vehicle to generate electricity with a reactant gas supplied thereto, the method comprising:
   determining whether the vehicle is running at idle by determining that a throttle of the vehicle is closed or that an accelerator pedal of the vehicle is not depressed;
   predicting forthcoming stopping of operation of the vehicle running at idle by determining whether the vehicle is in one of a neutral gear and a parking gear; and
   reducing residual water inside the fuel cell when the forthcoming stopping of the operation of the vehicle is predicted,
   wherein the reducing residual water starts prior to an ignition switch being turned off and prior to the scavenging the residual water, and stops and shifts to the scavenging the residual water once the ignition switch is turned off.

2. The method according to claim 1 wherein the reducing residual water inside the fuel cell comprises causing at least part of the reactant gas to be detoured around a humidifier for humidifying the reactant gas, to lower a humidity of the reactant gas to be supplied to the fuel cell.

3. The method according to claim 1 wherein the reducing residual water inside the fuel cell comprises reducing a cooling performance of a cooling system for the fuel cell.

4. The method according to claim 1 wherein the reducing residual water inside the fuel cell comprises increasing a flow rate of the reactant gas to be supplied to the fuel cell.

5. The method according to claim 1 wherein the reducing residual water inside the fuel cell comprises reducing a pressure of the reactant gas supplied to the fuel cell.

6. The method according to claim 1 wherein the determining whether the vehicle is running at idle comprises:
   receiving a throttle opening signal from a throttle sensor; and
   determining whether the received throttle opening signal indicates that a throttle is closed.

7. The method according to claim 6, wherein the predicting forthcoming stopping of the operation of the vehicle comprises:
   measuring an elapsed time from a time when it is determined that the throttle is closed, based upon the received throttle opening signal; and
   determining whether the measured elapsed time is longer than a predetermined period of time.

8. The method according to claim 1, wherein the predicting forthcoming stopping of the operation of the vehicle comprises:
   detecting a position of the vehicle; and
   determining whether the detected position of the vehicle is within an area where the vehicle frequently stops.

9. The method according to claim 1, wherein an operation of the reducing residual water is different from an operation of the scavenging residual water.

10. The method according to claim 9, wherein:
    air having a humidity and a pressure is supplied to the fuel cell through an air compressor when the vehicle is running at idle, and the fuel cell is cooled when the vehicle is running at idle;
    the scavenging residual water is performed by supplying air to the fuel cell through an air compressor; and
    the reducing residual water is performed by supplying air to the fuel cell through the air compressor, wherein one or more of the following conditions applies during the reducing residual water: the supplied air has a lower humidity than the humidity for the vehicle running at idle, the fuel cell is cooled less intensively than when the vehicle is running at idle, and the supplied air has a lower pressure than the pressure for the vehicle running at idle.

11. The method according to claim 1, wherein the reducing residual water ends when a shift lever shifts to a D gear position or an R gear position.

\* \* \* \* \*